April 8, 1958 F. L. HARDESTY 2,830,116
POWER MEGAPHONE

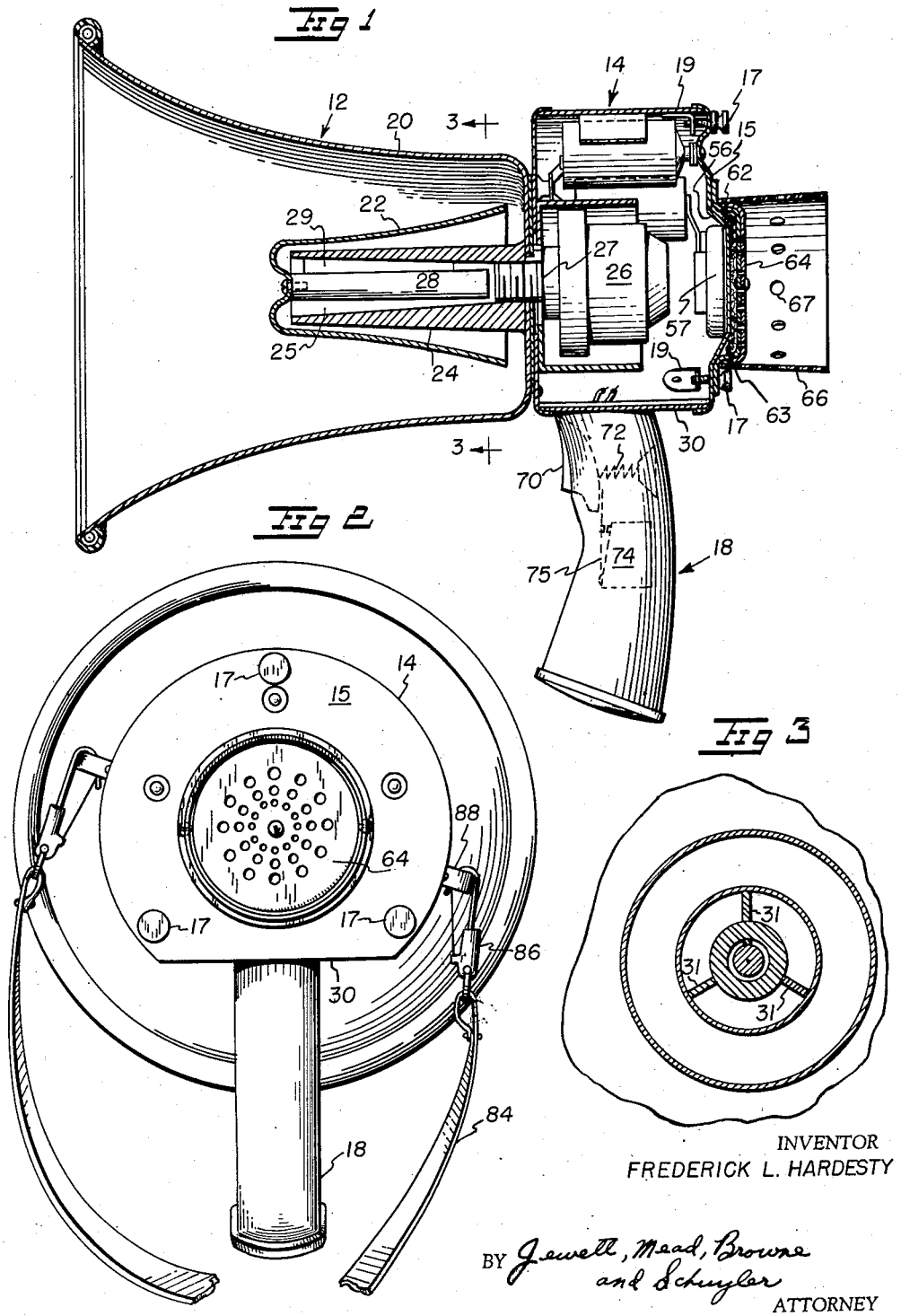
INVENTOR
FREDERICK L. HARDESTY

Filed July 20, 1953 3 Sheets-Sheet 2

INVENTOR
FREDERICK L. HARDESTY

BY Jewett, Mead, Browne
and Schuyler
ATTORNEY

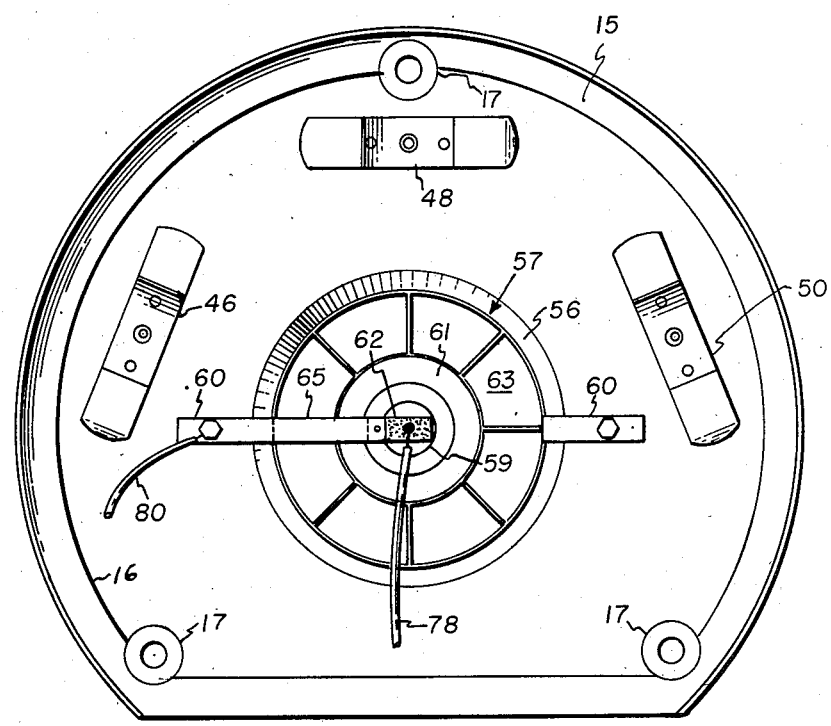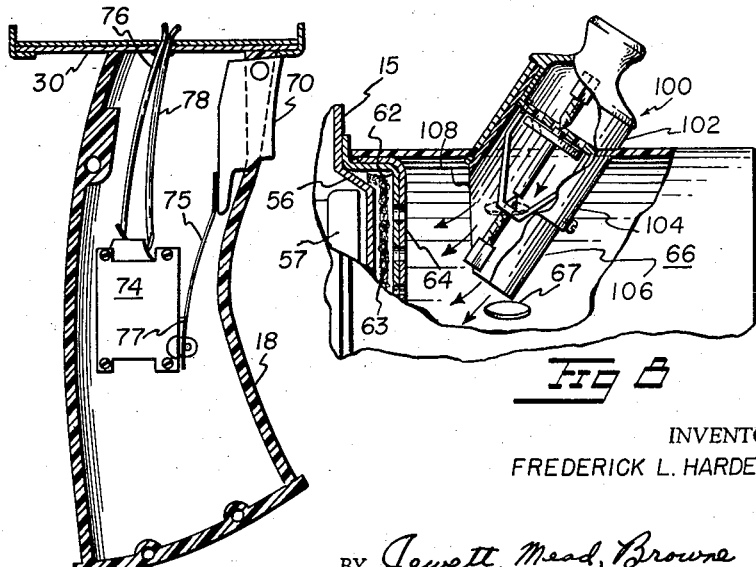

United States Patent Office 2,830,116
Patented Apr. 8, 1958

2,830,116

POWER MEGAPHONE

Frederick L. Hardesty, Silver Spring, Md., assignor to Austin-Lee, Inc., Washington, D. C., a corporation of Delaware Application July 20, 1953, Serial No. 369,126

10 Claims. (Cl. 179—1)

This invention relates to power megaphones, and more particularly to a portable, completely self-contained power megaphone.

There is a great need in many fields of activity for a portable megaphone to provide communication and to convey information in situations where the unaided human voice does not have the necessary volume. For example, such portable megaphones have great utility in certain types of military operations, in civil defense activities, in public emergencies, and also in connection with public events, such as football games and other similar activities.

While various power megaphones are available on the market, most of the power megaphones with which I am familiar utilize power supply and amplifying arrangements which are not incorporated directly in the power megaphone structure, but which are contained in separate units connected by a conductor cable to the power megaphone. Megaphones of this type frequently do not have the portability characteristics desirable in a portable megaphone, since such megaphones are usually awkward to carry and also have a substantial weight. For example, some presently available power megaphones have an overall weight in excess of 25 pounds.

Accordingly, it is an object of this invention to provide a simple portable lightweight power megaphone which is completely self-contained and which does not require auxiliary power and amplifying units.

It is a further object of this invention to provide a portable megaphone utilizing small dry cell batteries of the type commonly employed in flashlights as its power supply.

It is a still further object of this invention to provide a portable power megaphone having a simple and easily accessible housing for a dry cell power supply.

In accordance with these objectives, this invention provides a portable power megaphone having a loudspeaker horn and a housing at the base of the horn in which are contained a permanent magnet driving coil for the horn, and a dry cell battery supply for the horn. The housing is provided with a detachable cover member on which is mounted a carbon microphone unit electrically connected in series with the batteries and the driving coil for the horn. A pistol grip handle member is provided, and houses a trigger switch which is used to close the electrical circuit of the megaphone. A microphone shield member may be detachably positioned on the cover member to surround the mouthpiece of the microphone in order to reduce the ambient noise input to the microphone and to focus the voice signal toward the microphone.

The features of the invention which are believed to be novel are set forth with particularity in the appended claims. The invention itself, however, both as to its organization and use, together with further objects and advantages thereof, may best be understood by reference to the following description taken in connection with the accompanying drawings in which:

Fig. 1 is a side elevation, partially in section, of the portable power megaphone of my invention;

Fig. 2 is an end view of the megaphone, looking toward the left of Fig. 1;

Fig. 3 is a view in section along line 3—3 of Fig. 1;

Fig. 5 is an elevation of the inside of the cover for the power supply housing;

Fig. 6 is a sectional detail view of the handle member for the megaphone;

Fig. 8 is a fragmentary side elevation, partially in section, illustrating how a sound-making auxiliary device may be used with the power megaphone.

Figure 4:
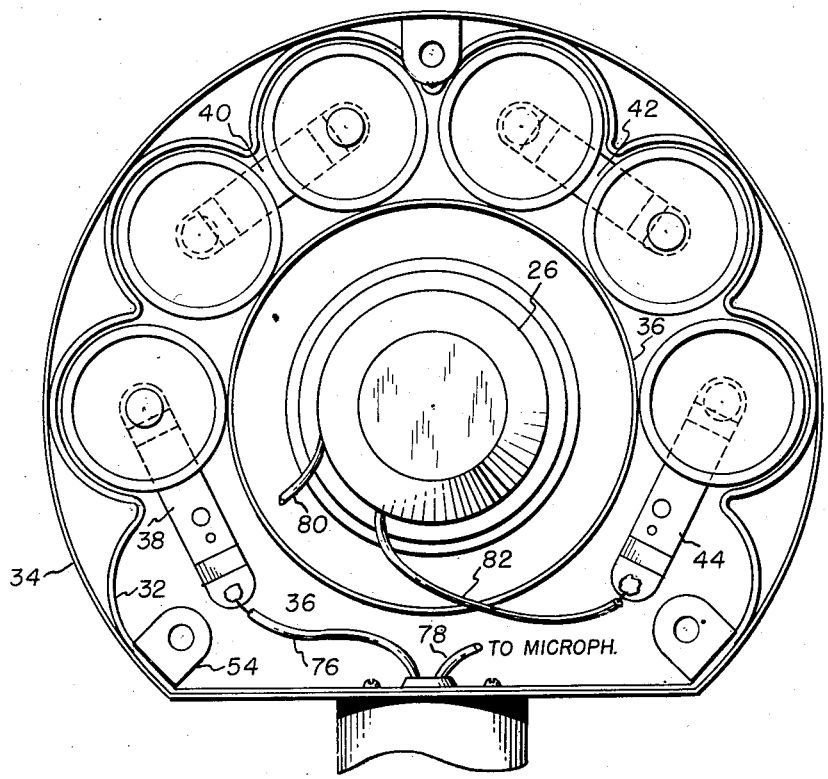
Fig. 4 is an enlarged detail view of the power supply and loudspeaker coil housing, with cover removed.
Figure 7:
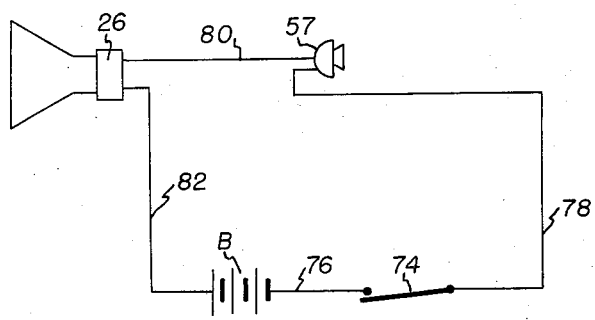
Fig. 7 is a wiring diagram of the electrical circuit of the power megaphone.

Referring now to the drawing, the power megaphone comprises a loudspeaker horn assembly generally designated as 12, a housing 14 for the dry cell battery power supply, the driving coil for the loudspeaker, and the microphone, and a pistol grip handle 18 which carries the switch used for energizing the power megaphone.

The horn assembly 12 includes a folded outer horn 20, an intermediate horn 22, and an inner horn 24. The base of the outer horn 20 is provided with an aperture which is superposed with respect to an aperture in the base of housing 14 to permit connection of the inner horn 24 to the loudspeaker driving coil assembly, as will be described. The inner horn 24 is provided with an axially extending bore 25 which is threaded at its end disposed toward the base of outer horn 20.

To serve as a support for intermediate horn 22, a post member 28 is axially positioned within the inner horn 24, post 28 being itself supported by a web 29 extending between the outer surface of post 28 and the inner surface of horn 24. The base of intermediate horn 22 is attached by a screw to the outer end of post 28 with the mouth of horn 22 being directed toward the base of outer horn 20. Radially extending ribs may be provided on the outer surface of inner horn 24 to maintain intermediate horn 22 in properly spaced relation with respect to inner horn 24.

The housing 14 is nearly cylindrical in shape but is provided with one chord-like flat side 30 to which the handle 18 is connected. Axially positioned within the housing 14 is a permanent magnet loudspeaker coil unit 26 having a hollow screw-threaded stud member 27 which passes through the apertures in the base of housing 14 and the base of horn 20 to engage the screw-threaded bore of inner horn 24. Since the hollow stud 27 communicates with the diaphragm of the loudspeaker coil unit 26, the sounds reproduced by the loudspeaker coil unit 26 are thus transmitted into the horn assembly. At the same time, the screw-threaded connection between the loudspeaker coil assembly 26 and the inner horn 24 maintains the horn assembly and the housing 14 joined together in assembled relation.

A cover member 15 is provided for the housing and is retained in position by means of captive screws 17 which engage screw-threaded bores in bracket members 19 attached to the inner surface of housing 14. A gasket member 16 is provided around the periphery of the inside surface of the cover member.

The power supply for the power megaphone comprises a plurality of small dry cell batteries, of the cylindrical type commonly used in flashlights, and in the embodiment shown, six dry cell batteries are used. Such batteries have a voltage rating of approximately 1.5 volts so that, when the six batteries shown in Fig. 4 are connected in series, the total voltage output of the batteries is approximately 9 volts. The batteries are disposed within the housing 14 with their axes parallel to the axis of the housing and are retained in position within the housing 14 by a metal retaining strip 32 which is rigidly connected, as by spot welding, for example, to the inner surface of the arcuate side wall 34 of the housing. The retaining member 32 is preferably a single integral strip which is bent into a plurality of connected semi-cylindrical arcuate curved portions, each having a radius substantially equal to the outer radius of the dry cell batteries. Each of the semi-cylindrical curved portions of strip 32 serves to retain a single dry cell battery along substantially one-half of its circumference. The batteries are supported along the portion of their circumference not embraced within the curved portion of strip 32 by a hollow cylindrical cup-like retaining member 36 which coaxially surrounds the loudspeaker driving coil 26 within the housing 14. Retaining cylinder 36 is attached to the base of housing 14 by screws which pass through the base of housing 14 and through the base of outer horn 20. The outer diameter of cylindrical retaining member 36 is such that the outer wall of retaining member 36 is substantially tangent to the walls of the respective dry cells.

A plurality of spring contacts 38, 40, 42 and 44 are insulatingly attached to the base of housing 14, and a plurality of similar spring contacts 46, 48 and 50 are insulatingly fastened to the inside surface of cover member 15. The contacts may be made of beryllium copper or other suitable conducting material which will retain its spring characteristics under adverse operating conditions. The contacts fastened to the base of the housing member 14 are adapted to engage the terminals at one end of the dry cell batteries, while the spring contacts of the cover member 15 are adapted to engage the oppositely disposed terminals of the dry cell batteries. When the dry cell batteries are placed in the space between the retainer member 32 and the outer wall of the retaining cylinder 36 with polarities of adjacent dry cells reversed, the dry cells are connected in series circuit by the contacts 38—50 of the housing and cover member.

The metal cover member 15 is provided with a centrally positioned dished portion 56 to receive a sealed microphone unit 57 which may be of the conventional carbon button type used in commercial telephone handsets. The dished portion 56 is provide with a central aperture of substantial area through which sound waves pass to the microphone unit 57. The side of the carbon button microphone disposed toward the inside of housing 14 is provided with a central terminal 59 which is insulated from a radially outer annular terminal 61. Terminal 61 is grounded to the metal casing 63 of the carbon button which, in turn, is grounded to the metal cover 15. The sealed carbon microphone unit is retained in position within the dished cavity or opening by means of a pair of oppositely disposed clamp members 60 which are detachably connected to the inner surface of the cover member adjacent the dished aperture by means of screws passing through the cover member, the same screws also serving to retain in position a mouthpiece unit 62 disposed on the outer surface of the cover member. The mouthpiece 62 is provided with a plurality of radially aligned perforations and has a rotatable perforated shutter member 64 which may be rotated to close the perforations of the mouthpiece to keep out moisture from he microphone unit when the microphone is not in use. In order to reduce acoustical feedback, a fiber pad 63 which may be made of fiber glass or other sound-absorbing material is positioned in the space between the inner surface of mouthpiece 62 and the outer surface of microphone 57. The outer peripheral edges of pad 63 are supported by the outer surface of the dished portion 56 of the cover member 15.

In order to reduce pick-up of ambient noise by the microphone and also to serve as a means of concentrating or focusing speech signals to the microphone, a microphone shield 66, which may be made of plastic or any other suitable material, may be disposed around the mouthpiece 62, being held in position by frictional engagement with the outer edge of the mouthpiece. The microphone shield 66 is preferably provided around its circumference with holes 67 which are preferably spaced approximately midway of the axial dimension of the shield. These holes tend to minimize undesirable sound effects which might otherwise be caused by reflection or echoing of voice waves within the shield member.

As will best be seen in Figs. 1 and 6, the pistol grip handle member 18 is formed of a pair of mating portions which are each connected at one end to the flat side 30 of the housing 14 and which are joined together by countersunk screws extending transversely through the handle member. A trigger member 70 is pivotally connected to the interior of the handle member 18 adjacent its connection to the side 30. A spring member 72 normally biases the trigger member 70 in an outward direction. A microswitch 74, having a pivoted lever member 75 and a projecting pin member 77, is mounted inside the handle 18 in such manner that lever 75 is in the path of movement of the outer end of trigger 70. Counterclockwise movement imparted to lever 75 by trigger member 70 depresses pin 77 to close the megaphone circuit through the microswitch.

The electrical wiring for the power megaphone is shown in Figs. 4–7. It will be seen that one side of the series connected batteries is connected through contact 38 and lead 76 to one side of the microswitch 74. The other side of the microswitch 74 is connected by conductor 78 to terminal 59 of the carbon microphone unit 57. Terminal 61 of the carbon microphone unit 57 is connected by conductor 80 to one side of the loudspeaker driving coil 26, the other side of coil 26 being connected by conductor 82 to spring contact 44 and thereby to the other side of the battery supply. The conductor 80 may be grounded to the surface of metal cover 15 which is at the same potential as terminal 61. A spring clip 65 may be bolted to cover 15 to serve as a support for conductor 78 where it engages the central terminal 59 of the carbon microphone unit, conductor 78 being insulated from spring clip 65 by insulation 67.

In order to facilitate carrying the power megaphone, a strap 84 is provided and is connected by spring clasp members 86 to eyelet pads 88 which are attached to oppositely disposed points on the outer wall of the housing 14, as shown in Fig. 2.

The power megaphone of this invention may be used for either voice amplification or for amplification of the sound of various noise-making devices such as sirens, horns, or whistles. There is shown by way of example in Fig. 8 the manner in which an auxiliary noise-making device may be used in connection with the power megaphone. A siren generally indicated at 100 is supported by the wall of microphone shield 66, the siren being angularly mounted so that sound waves emitted from the siren are directed toward the mouthpiece 62 of the microphone 57. The siren is maintained in position by two augularly cut complementary bushing sections 102 and 104 which surround and are rigidly attached to the outer cylindrical surface of the barrel or casing 106 of the siren 100, the bushing sections 102 and 104 being disposed on opposite sides of the wall of the mircophone shield 66. To facilitate the passage of sound waves from the siren to the microphone, the opening at the outer end of the siren barrel or casing is enlarged by truncating the outer end of the siren casing, as indicated at 108.

It will be seen from the foregoing that I have provided a power megaphone which is adapted to operate on a dry cell battery supply contained in a housing integral with the megaphone. Furthermore, the power megaphone of my invention is very light-weight, weighing considerably less than other available power megaphones.

Also, it can be seen that I have provided a housing for my power supply, the interior of which is readily accessible for replacement of batteries or any other purpose, merely by removing the readily detachable cover member.

While there has been shown and described a particular embodiment of my invention, it will be obvious to those skilled in the art that various changes and modifications can be made therein without departing from the invention and, therefore, it is aimed in the appended claims to cover all such changes and modifications as fall within the true spirit and scope of the invention.

What I claim as my invention is:

1. A portable power megaphone comprising an outer horn, an inner horn axially disposed within said outer horn, a housing disposed at the base of said outer horn, a loudspeaker driving coil unit in said housing, means extending through the bases of said outer horn and said housing to connect said loudspeaker driving coil unit to said inner horn, a removable cover member for said housing, a microphone carried by said cover member, means for receiving a plurality of dry cell batteries within said housing, contact means carried by the base of said housing and by the inside surface of said cover member for interconnecting said dry cell batteries to each other, a switch means, and conductor means interconnecting said batteries, said microphone, said loudspeaker coil unit, and said switch means.

2. A portable power megaphone comprising an outer horn, an inner horn axially disposed within said outer horn, a housing disposed at the base of said outer horn, a loudspeaker coil unit in said housing, the base of said outer horn and the base of said housing being provided with superposed substantially axially positioned apertures, said inner horn and said loudspeaker coil unit being connected together by means extending through said superposed apertures, a removable cover member for said housing, retainer means within said housing for receiving a dry cell battery supply, contact means carried by said housing and by said cover for interconnecting said battery supply, a microphone carried by said cover, a switch means, and conductor means for interconnecting said battery power supply, said microphone, said loudspeaker coil unit and said switch means.

3. A portable power megaphone comprising an outer horn, an inner horn axially disposed within said outer horn, a housing disposed at the base of said outer horn, a loudspeaker coil unit in said housing, the base of said outer horn and the base of said housing being provided with superposed substantially axially positioned apertures, said inner horn and said loudspeaker coil unit being connected together by means extending through said superposed apertures, a removable cover member for said housing, retainer means within said housing for receiving a dry cell battery supply, contact means carried by said housing and by said cover for interconnecting said battery supply, a microphone carried by said cover, a handle member extending outwardly from said housing, a switch means carried by said handle member, and conductor means for interconnecting said battery supply, said microphone, said loudspeaker coil unit and said switch means.

4. A portable power megaphone comprising an outer horn, an inner horn axially disposed within said outer horn, a cylindrical housing unit disposed at the base of said outer horn, a loudspeaker coil in said housing unit, said housing unit having a side wall and a base substantially perpendicular to said side wall, the base of said outer horn being provided with an axially positioned aperture in superposed relation to an axial aperture in the base of said housing, said inner horn and said loudspeaker coil being connected together by means extending through said superposed apertures, a retaining member within said housing for receiving a plurality of dry cell batteries having their axes disposed substantially parallel to the axis of said housing, said retaining member being attached to the inner side wall surface of said housing and comprising a plurality of battery retaining portions adapted to grip the outer periphery of said dry cell batteries, a removable cover for said housing lying in a plane substantially perpendicular to said base of said housing, said cover being apertured to receive a microphone unit, contact means carried by said base of said housing and by the inside surface of said cover to interconnect said batteries with each other, a handle member extending from said housing, a switch means carried by said handle, and conductor means interconnecting said batteries, said microphone, said loudspeaker coil and said switch.

5. A portable power megaphone comprising an outer horn, an inner horn axially disposed within said outer horn, a housing disposed at the base of said outer horn, a loudspeaker coil unit in said housing, the base of said outer horn and the base of said housing being provided with superposed substantially axially positioned apertures, said inner horn and said loudspeaker coil unit being connected together by means extending through said superposed apertures, a removable cover member for said housing, a retaining member within said housing for receiving a plurality of cylindrical dry cell batteries having their axes disposed substantially parallel to the axis of said housing, said retaining member being attached to the inner side wall surface of said housing and comprising a plurality of connected substantially semi-cylindrical arcuate portions adapted to embrace the periphery of said dry cell batteries, additional retaining means carried by said housing for engaging said batteries on a portion of their surface not engaged by said arcuate portions, contact means carried by the base of said housing and by the inner surface of said cover member to serially interconnect said plurality of dry cell batteries, a microphone carried by said cover, a switch means, and conductor means for interconnecting said dry cell batteries, said microphone, said loudspeaker coil and said switch means.

6. A portable power megaphone comprising an outer horn, an inner horn axially disposed within said outer horn, a cylindrical housing disposed at the base of said outer horn, a loudspeaker coil unit axially disposed in said housing, the base of said outer horn being provided with an axially-positioned aperture in superposed relation to an axial aperture in the base of said housing, said inner horn and said loudspeaker coil unit being connected together by means extending through said superposed apertures, a removable cover member for said housing, a microphone carried by said cover, a retaining member within said housing for receiving a plurality of cylindrical dry cell batteries having their axes disposed substantially parallel to the axis of said housing, said retaining member being attached to the inner side wall surface of said housing and comprising a plurality of semi-cylindrical arcuate portions adapted to embrace the periphery of said dry cell batteries, a cylindrical member axially positioned within said housing to surround said loudspeaker coil unit, the outer surface of said cylindrical member engaging said batteries on a portion of their surface not engaged by said arcuate portions, contact means carried by the base of said housing and by the inner surface of said cover member to serially interconnect said plurality of dry cell batteries, a handle member extending from said housing, switch means carried by said handle, and conductor means for interconnecting said dry cell batteries, said microphone, said loudspeaker coil unit and said switch means.

7. A portable power megaphone comprising an outer horn, an inner horn axially disposed within said outer horn, a cylindrical housing disposed at the base of said outer horn, said housing having a base and a side wall extending substantially perpendicularly to said base, a loudspeaker coil unit substantially axially positioned within said housing, means extending through the bases of said outer horn and said housing to connect said loudspeaker coil unit to said inner horn, retaining means within said housing for receiving a plurality of dry cell batteries, said retaining means being arcuately disposed between the outer periphery of said loudspeaker coil unit and the inner surface of the side wall of said housing, a removable cover for said housing lying in a plane substantially perpendicularly to said base, a microphone carried by said cover, contacts carried by said base of said housing and by said cover for interconnecting said dry cell batteries, a switch means, and conductor means interconnecting said batteries, said microphone, said loudspeaker coil unit and said switch means.

8. A self-contained portable power megaphone comprising a horn, a housing at the base of said horn, said housing having a curved wall spaced radially from the longitudinal axis of said horn, a loudspeaker coil unit positioned substantially axially within said housing, a retaining means for a plurality of direct current batteries disposed in the space between said loudspeaker coil unit and said curved wall of said housing, a microphone carried by said housing, said microphone having a mouthpiece, a sound-absorbing material interposed between said microphone and said mouthpiece to reduce acoustical feedback, and conductor means connecting said batteries, said microphone, and said loudspeaker coil unit in series relation with each other.

9. A self-contained portable power megaphone comprising a horn, a housing at the base of said horn, said housing having a curved wall spaced radially from the longitudinal axis of said horn, a loudspeaker coil unit positioned substantially axially within said housing, a retaining means for a plurality of direct current batteries disposed in the space between said loudspeaker coil unit and said curved wall of said housing, a microphone carried by said housing, said microphone having a sound inlet means including a separately detachable hollow shield member to direct sound waves into said microphone, said shield member being provided with a plurality of circumferentially arranged apertures intermediate its length to reduce sound reflection within said shield member, and conductor means connecting said batteries, said microphone and said loudspeaker coil unit in series relation with each other.

10. A self-contained portable power megaphone comprising a horn, a housing at the base of said horn, said housing having a curved wall spaced radially from the longitudinal axis of said horn, a loudspeaker coil unit positioned substantially axially within said housing, a retaining means for a plurality of direct current batteries disposed in the space between said loudspeaker coil unit and the curved wall of said housing, a microphone carried by said housing, said microphone having a sound inlet means including a separately detachable hollow shield member directed toward said microphone, an auxiliary sound-making device supported by said shield member and directed toward said microphone, and conductor means connecting said batteries, said microphone and said loudspeaker coil unit in series relation with each other.

References Cited in the file of this patent

UNITED STATES PATENTS

| | | |
|---|---|---|
| 2,218,389 | Warmbier | Oct. 15, 1940 |
| 2,301,459 | Sanial | Nov. 10, 1942 |
| 2,485,278 | Gilman et al. | Oct. 18, 1949 |
| 2,692,913 | Kamimori | Oct. 26, 1954 |

FOREIGN PATENTS

| | | |
|---|---|---|
| 437,973 | Great Britain | Nov. 8, 1935 |